US008377264B2

(12) United States Patent
Tokuda et al.

(10) Patent No.: US 8,377,264 B2
(45) Date of Patent: Feb. 19, 2013

(54) METHOD FOR DISPOSAL OF ORGANIC WASTE MATERIAL AND APPARATUS FOR THE METHOD

(75) Inventors: Yoshiyuki Tokuda, Tokyo (JP); Toshiaki Okauchi, Tokyo (JP)

(73) Assignee: N.M.G. Environmental Development Co., Ltd (JP)

( * ) Notice: Subject to any disclaimer, the term of this patent is extended or adjusted under 35 U.S.C. 154(b) by 715 days.

(21) Appl. No.: 12/521,687

(22) PCT Filed: Dec. 28, 2007

(86) PCT No.: PCT/JP2007/001494
§ 371 (c)(1),
(2), (4) Date: Jun. 29, 2009

(87) PCT Pub. No.: WO2008/081598
PCT Pub. Date: Jul. 10, 2008

(65) Prior Publication Data
US 2010/0326811 A1 Dec. 30, 2010

(30) Foreign Application Priority Data
Dec. 28, 2006 (JP) .................................. 2006-355860

(51) Int. Cl.
*C10B 47/28* (2006.01)
*C10B 1/00* (2006.01)

(52) U.S. Cl. ........... 201/2.5; 110/210; 110/345; 201/28; 202/82; 422/184.1

(58) Field of Classification Search .................... 201/2.5, 201/4, 28; 422/184.1, 187, 608, 609, 610, 422/611, 622, 627; 588/320, 321; 423/243.11, 423/245.3, 502, DIG. 18; 210/774; 110/210, 110/215, 345; 159/47.3; 203/47; 202/82
See application file for complete search history.

(56) References Cited

U.S. PATENT DOCUMENTS 4,620,492 A * 11/1986 Vogg et al. ................ 423/240 R
4,977,839 A * 12/1990 Fochtman et al. ............ 110/346

FOREIGN PATENT DOCUMENTS

| JP | 07-241439 A | 9/1995 |
| JP | 11-230522 A | 8/1999 |
| JP | 2002-205044 A | 7/2002 |
| JP | 2004-307237 A | 11/2004 |
| JP | 2006-159036 A | 6/2006 |
| JP | 2006-225483 A | 8/2006 |

OTHER PUBLICATIONS

Machine translation of JP 7-241439 (9 pages).*
Machine translation of JP 7-241439 (9 pages) Sep. 1995.*
International Search Report for PCT/JP2007/001494.

* cited by examiner

*Primary Examiner* — Jill Warden
*Assistant Examiner* — Joye L Woodard
(74) *Attorney, Agent, or Firm* — Brooks Kushman P.C.

(57) ABSTRACT

Disclosed is an organic material disposal method comprising a step for thermally decomposing a raw organic material and a gas treatment step for treating a gas generated in the preceding step, wherein the thermal decomposition step comprises a substep of decomposing the raw organic material into a carbide and a gaseous component, and the gas treatment step comprises the following substeps (1) to (5): (1) catalytically oxidizing the gaseous component produced in the thermal decomposition step; (2) neutralizing/washing the oxidized gas; (3) subjecting a waste water produced in the neutralization/washing step to the solid-liquid separation; (4) further thermally decomposing a solid component separated in the solid-liquid separation step together with the raw organic material in the thermal decomposition step; and (5) re-using a liquid component separated in the solid-liquid separation step in the solid-liquid separation step and/or the neutralization/washing step.

20 Claims, 4 Drawing Sheets

METHOD FOR DISPOSAL OF ORGANIC WASTE MATERIAL AND APPARATUS FOR THE METHOD

TECHNICAL FIELD

The present invention relates to a method of treating gas generated during thermal decomposition of organic waste and apparatus therefore.

BACKGROUND

Treatment of organic waste has been conventionally carried out by incinerating waste material in an incinerator. However, as such treatment method generates dioxine and carbon dioxide during the incineration, treatment of industrial waste has recently been carried out by using thermal decomposition reaction. A number of apparatuses of treating organic waste, in which organic waste exemplified by municipal waste is subjected to thermal decomposition under a reducing atmosphere to completely combust the waste material, thereby reducing generation of dioxine and carbon dioxide, have been developed. In addition, a number of systems that recycle resources, for example, the heat, water, and wood vinegar produced by cooling of a generated gas, have been developed.

JP 2004-307237A describes an apparatus in which ceramics is produced by treating organic waste by way of such thermal decomposition reaction.
Patent Literature 1: JP2004-307237A
Patent Literature 2: JP H11-230522A

DISCLOSURE OF THE INVENTION

Problems to be Solved by the Invention

In an apparatus of treating waste which utilizes such thermal decomposition reaction, material organic matter is decomposed into carbide and gaseous components to produce ceramics from the carbide, while it is contemplated, in order to make good use of the gaseous component as an insecticide and soil conditioner, to carry out liquification of the gaseous component into wood vinegar and to perform a secondary fabrication such as neutralization.

However, such gaseous component cannot be treated completely by a conventional apparatus and as there are cases where the remaining untreated gas is discharged into the surrounding environment, thus, it is not exactly that all resources are being effectively recycled.

Furthermore, some input materials may comprise oil and fat contents as well as other substances such as ammonia which may cause a foul odor, therefore, it is necessary to eliminate those components in order to effectively utilize such gaseous component.

The present invention is directed to provide a method and apparatus of treating gas generated during thermal decomposition of organic waste in order to fully and effectively utilize the gas. According to the present invention, in the gas treatment step, the gas generated in the thermal decomposition step is separated into solid and liquid components, and the solid component is input in to the thermal decomposer unit along with material organic matter for another thermal decomposition while the liquid component is recycled to treat the gas generated in the thermal decomposition step, so that the present invention provides a more environmentally superior method/apparatus of treating organic matter by circulating the gas generated in the organic waste treatment process in those treatment steps.

Means to Solve the Problems

A method of treating organic matter, the method comprising the steps of thermal decomposition of material organic matter and treating gas generated in the thermal decomposition step, characterized in that;

said step of thermal decomposition comprises the step of decomposing said material organic matter into carbide and gaseous component, and said gas treatment step comprises the steps of:

(1) catalytically oxidizing the gaseous component generated in said thermal decomposition step;

(2) neutralizing/washing said oxidized gas;

(3) subjecting waste water produced in said neutralization/washing step to solid-liquid separation;

(4) thermally decomposing solid component again separated in said solid-liquid separation step together with said material organic matter in said thermal decomposition step; and (5) reutilizing the liquid component separated in said solid-liquid separation to said solid-liquid separation step and/or said neutralization/washing step.

As in the above, the method of treating organic matter according to the present invention utilizes catalytic oxidation of the gas generated in the thermal decomposition step to convert hydrocarbon gaseous component in the gas into carbon dioxide and water, and further convert residual gas from the catalytic oxidation step into water, salts, and the like by neutralization/washing treatment. Furthermore, waste water generated in this neutralization/washing step is subjected to solid-liquid separation such that the separated solid component is re-directed to the thermal decomposition step where it is thermally decomposed again while the liquid component is re-directed to the solid-liquid separation step and/or the neutralization step to be reutilized. Therefore, the gas generated in the thermal decomposition step can be fully recycled in the thermal decomposition and gas treatment steps by solid-liquid separation.

The material organic matter which can be used in the method of treating organic matter according to the present invention includes, in addition to general industrial waste, any organic matter such as residues and/or food items including soy pulp, shochu (Japanese distilled spirit) lees, sake lees, beer lees, rice bran, garbage, onion skin, straw, chaff, fallen leaves, mown grass, potato, corn, daikon radish, cabbage, fish internal organs, coffee grounds, juice dregs, polypropylene, polyester, polyethylene, polyurethane, polystyrene, polycarbonate, construction sludge, used tatami mats, worn tires, waste lumber, waste paper, worn clothes, paper diapers, animal corpses, bovine meat and bone meal, waste paint, and the like. These organic matter include those to be disposed of as well as those not for disposal.

In the method of treating organic matter relating to the present invention, the solid-liquid separation step may comprise the step of filtering the liquid produced therein through a bag filter.

Further, the method of treating organic matter relating to the present invention may comprise the step of further clarifying the filtered liquid by a microbial treatment layer The apparatus for treating organic matter, said apparatus thermally decomposing material organic matter in a thermal decomposer unit and comprising a gas treatment unit for treating gas generated in said thermal decomposition step, is characterized in that; said thermal decomposer unit comprises means for decomposing said material organic matter into carbide and gaseous component, said gas treatment unit comprises means for oxidizing the gaseous component generated in said thermal decomposer unit; means for neutralizing/washing said oxidized gas; and means for subjecting waste water produced in said neutralization/washing to solid-liquid separation, and that said apparatus thermally decomposing a solid component again separated in said means for solid-liquid separation together with said material organic matter in said thermal decomposer unit and recycling the liquid component separated to said means for solid-liquid separation in said means for neutralization/washing.

The apparatus for treating organic matter relating to the present invention may comprise a method of evaporating waste water generated in the preceding neutralization/washing in the solid-liquid separation method and a method of separating the liquid produced in this evaporation into solid and liquid components.

Further, in the apparatus for treating organic matter relating to the present invention, the solid-liquid separation method may comprise a method of distilling the liquid produced in the preceding evaporation method.

Moreover, in the apparatus for treating organic matter relating to the present invention, the solid-liquid separator unit may further comprise a method of subjecting the liquid component separated by the filtration method to a microbial treatment.

Effects of the Invention

According to the method and apparatus of the present invention, gas generated in the thermal decomposition step is recycled by subjecting the gas to solid-liquid separation and re-directing it to the thermal decomposition and neutralization/solid-liquid separation steps. Thus, environmentally toxic substances and the like included in material organic matter are not discharged from the apparatus and can be recycled within the apparatus, thereby enabling to provide a more environmentally superior method/apparatus of treating organic matter.

Therefore, the present invention enables treatment of organic matter without causing a pollution problem of dioxine generation.

Furthermore, since the present invention also recycles the waste water produced in the gas treatment by re-directing it to the neutralization step/solid-liquid separation step, the present invention is designed so that the waste water is not discharged from the apparatus, thereby preventing environmental pollution caused by the waste water.

Moreover, in the present invention, the solid-liquid separation of the waste water produced in the gas treatment step is carried out in a vacuum. Since the boiling point of the waste water is as low as 30-60 degrees C., preferably 40-50 degrees C., in a vacuum the solid-liquid separation of the waste water can be carried out with little external energy. Thus, the cost to recycle the waste water produced in the gas treatment can be reduced.

BEST MODE FOR CARRYING OUT THE INVENTION

Hereinafter, one example of a method/apparatus for treating organic matter of the present invention will be explained with reference to the figures.

Figure 1:
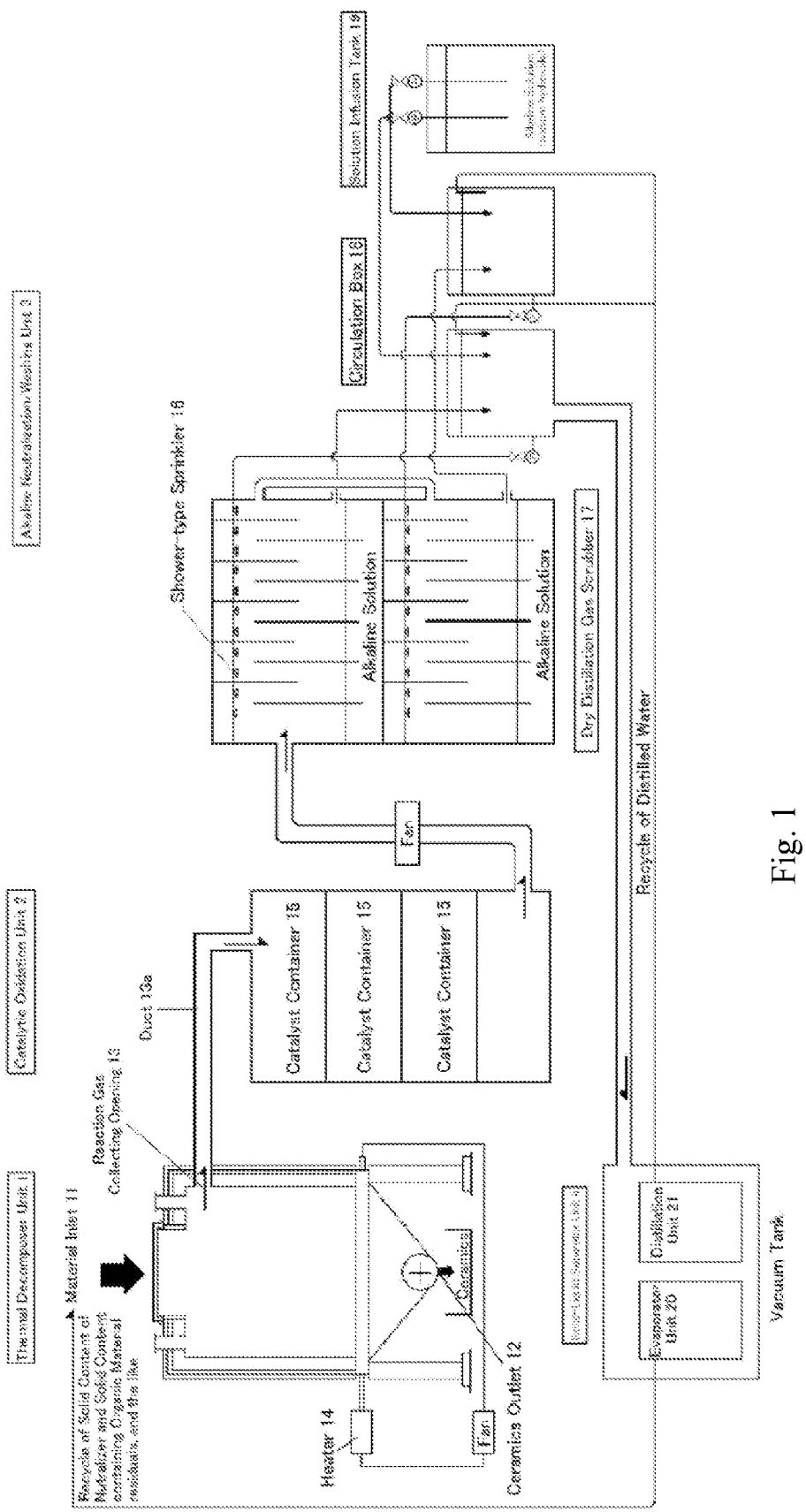
FIG. 1 is a schematic diagram of a ceramics-producing apparatus of the present invention.

FIG. 1 is a schematic diagram of one example of the apparatus for treating organic matter relating to the present invention.

In this example, the present invention is applied to an apparatus for treating organic matter using an industrial waste such as refuse as the material organic matter to produce ceramics from inorganic matter present in the material organic matter.

In this example, the treatment of organic matter is carried out using general refuse, which is an industrial waste, as the material organic matter; however, also included as the material organic matter are any organic matter such as residues and/or food items including soy pulp, shochu (Japanese distilled spirit) lees, sake lees, beer lees, rice bran, garbage, onion skin, straw, chaff, fallen leaves, mown grass, potato, corn, daikon radish, cabbage, fish internal organs, coffee grounds, juice dregs, polypropylene, polyester, polyethylene, polyurethane, polystyrene, polycarbonate, construction sludge, used tatami mats, worn tires, waste lumber, waste paper, worn clothes, paper diapers, animal corpses, bovine meat and bone meal, and waste paint. These organic matter include those to be disposed of as well as those not for disposal.

The apparatus of this example comprises a thermal decomposer unit 1, a catalytic oxidation unit 2 in which gas generated in the thermal decomposer unit 1 is oxidized via an oxidation catalyst, a alkaline neutralization/washing unit 3 in which residual gas after the treatment via an oxidation catalyst, and the solid-liquid separator unit 4 in which waste water produced in the neutralization/washing step is separated into solid and liquid components in a vacuum condition.

The material organic matter loaded from the material inlet is thermally decomposed in the thermal decomposer unit and separated into carbide and gaseous component. This carbide is subjected to further treatment in the thermal decomposer unit to produce ceramics. In turn, the gaseous component separated in the thermal decomposer unit is treated in a catalytic oxidation unit 2, in a neutralization/washing unit 3, and in a solid-liquid separator unit 4, and then becomes recycled within the present apparatus as described in the following.

Figure 2:
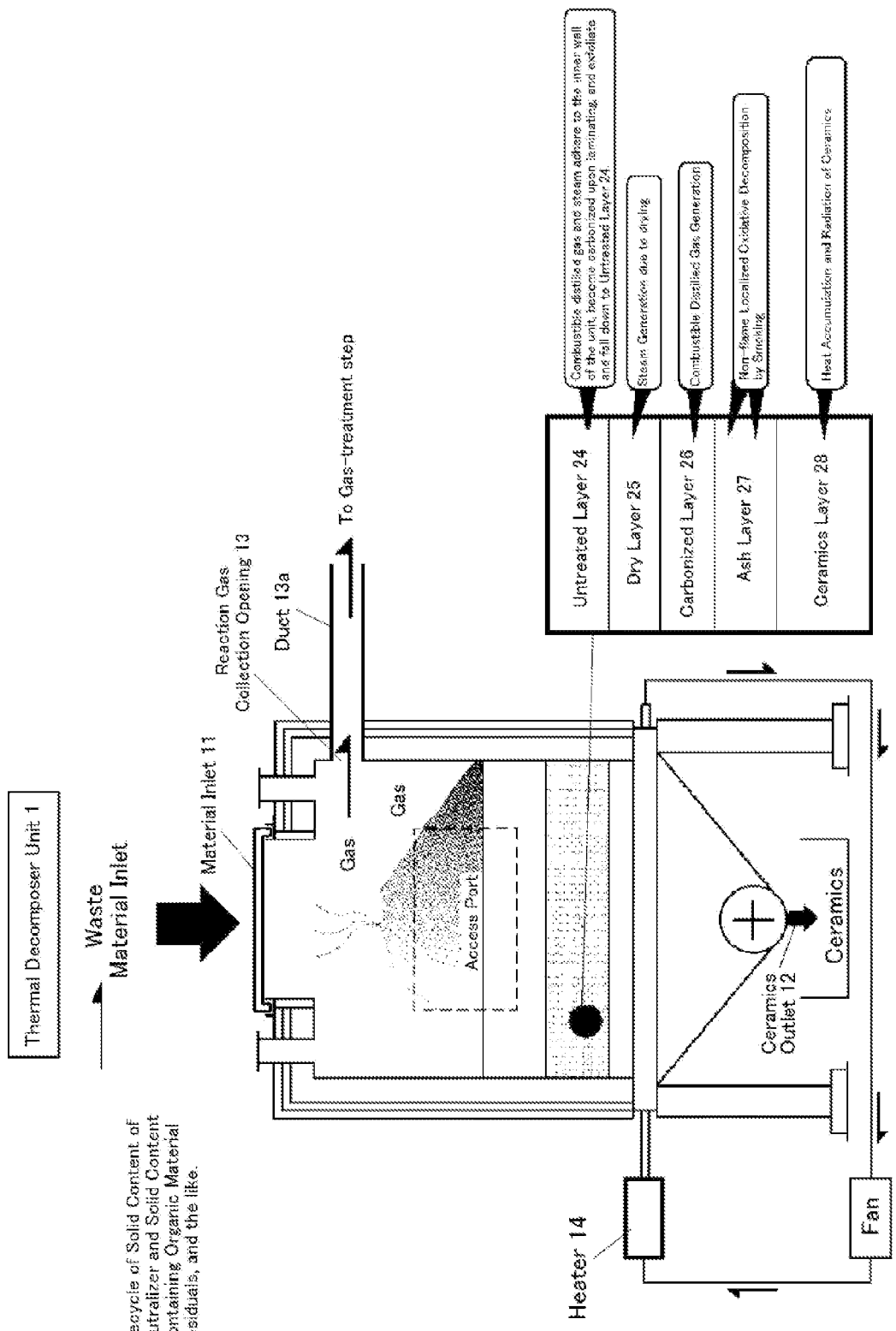
FIG. 2 is a schematic diagram of the thermal decomposer unit of the ceramics-producing apparatus of the present invention.

FIG. 2 is a schematic diagram of the thermal decomposer unit.

The thermal decomposer unit 1 comprises a material inlet 11 at the top and a ceramics outlet 12 at the bottom, and further a reaction gas collecting opening 13. Additionally, the material inlet 11 and the ceramics outlet 12 are configured such that an hermetic condition is maintained inside the decomposer unit 1 when the inlet and outlet are closed. The reaction gas collecting opening 13 is in communication with the catalytic oxidation unit 2 via a duct 13a so that the gas generated in the decomposer unit 1 is introduced into the catalytic oxidation unit 2 through the duct 13a, and subjected to subsequent treatment.

First, the ceramics production step in the present apparatus will be described.

In the initial operation step, organic waste which is material organic matter is loaded through the material inlet 11 and combusted once, followed by closing of the material inlet 11 and the ceramics outlet 12 to hermetically seal.

Since the temperature inside the thermal decomposer unit 1 has been increased to 400 degrees C. or higher by the previous combustion, material organic matter starts to thermally decompose in the decomposer unit 1. Suitable material organic matter includes, for example, paper, wood, vinyls (those made of polyvinyl chloride, polyethylene, polyethylene, polystyrene, and the like), and food remains in municipal-waste.

The gas generated in the above-described combustion and thermal decomposition flows, in the form of a fume, into the catalytic oxidation unit 2 through the reaction gas collecting opening 13 and the duct 13a.

There is no risk of material organic matter getting ignited even when the temperature inside the decomposer unit 1 increases as the unit is hermetically sealed and the atmosphere therein is maintained reductive.

That is, within the thermal decomposer unit 1, thermal decomposition proceeds utilizing the calorie of the organic matter itself that was loaded as the material organic matter. The material organic matter forms a untreated layer 24 as the thermal decomposition proceeds. Dry distilled gas and steam generated by thermal decomposition adhere to the inner wall of the unit in the form of tar, become carbonized upon laminating, and exfoliate and fall onto the untreated layer 24.

As the thermal decomposition of the untreated layer 24 proceeds, the untreated layer 24 becomes a dry layer 25 where steam is generated from the surface thereof due to drying.

The dry distilled gas is generated from the dry layer 25 as the thermal decomposition of the dry layer 25 further proceeds, so that components included in the material organic matter except carbon components and a trace amount of inorganic components evaporate in the form of a gas. The residual carbon components in the dry layer become carbonized and accumulate in the bottom portion of the decomposer unit 1, forming a carbonized layer 26. This carbon component also becomes gasified and evaporates as the thermal decomposition of the carbonized layer 26 further proceeds, and eventually, only inorganic components included in the material organic matter remain, forming an ash layer 27. At this point, provision of a small amount of oxygen to the space between the carbonized layer 26 and ash layer 27 (not shown) make the inorganic components bind with the small amount of oxygen to form inorganic oxides, i.e., ceramics 28, and remain at the bottom of the decomposer unit 1. This ceramics 28 is collected from the ceramics outlet 12 located at the lower or bottom part of the decomposer unit 1 to be utilized in various applications.

Next, the step of treating the gas generated in the above-described ceramics production step will be described.

Figure 3:
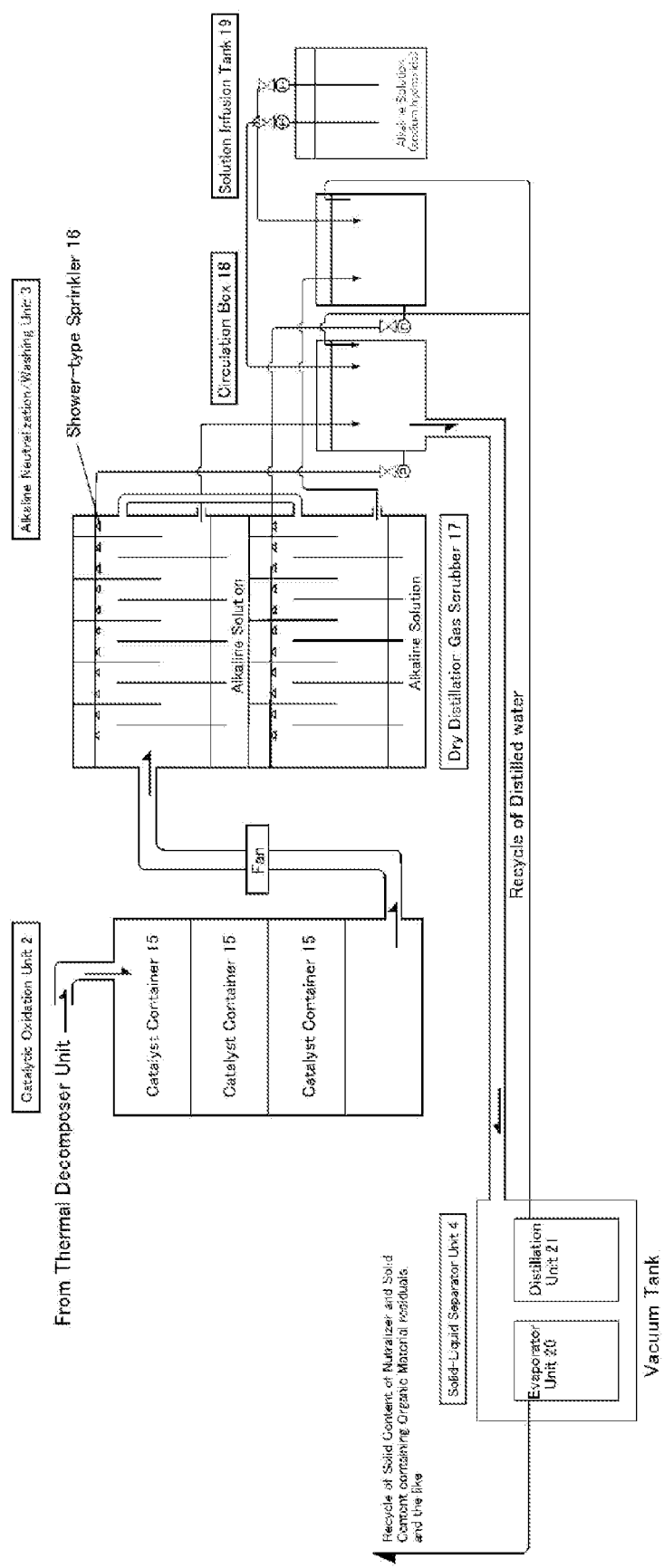
FIG. 3 is a schematic diagram of the gas treatment unit of the ceramics-producing apparatus of the present invention.

FIG. 3 is a schematic diagram of a series of gas treatment units.

A gas generated in the thermal decomposition is introduced into the catalytic oxidation unit 2 through the reaction gas collecting opening 13 and the duct 13a, passed through the catalyst container 15 where hydrocarbon gas is oxidized to become carbon dioxide and water. This catalytic oxidation step reduces the gas generated in the above-described thermal decomposition step by approximately 90% and the residual gas after the above-described catalytic oxidation treatment becomes a gas comprising elements such as chlorine, sulfur, nitrogen, and the like. The oxidation catalyst which may be used includes metals such as Pt, Cr, Cu and Mn, or metal oxides such as $Al_2O_3$.

Then, the residual gas is sent to the alkaline neutralization/washing unit 3 to be neutralized/washed. The alkaline neutralization/washing unit 3 comprises a dry distillation gas scrubber 17, a circulation box 18, and a solution infusion tank 19. The reason for passing the gas generated in the thermal decomposer unit through the catalytic oxidation unit first and then sending the gas to the alkaline neutralization/washing unit is because it is more efficient in treating gas to reduce the load by the catalytic oxidation prior to the neutralization/washing. The alkaline neutralization/washing agent is introduced from the solution infusion tank 19 into the circulation box 18 through where the agent is sprinkled from the shower-type sprinkler 16 which is provided on the dry distillation gas scrubber 17 via the circulation box 18. The alkaline neutralization/washing agent which was sprinkled and used in the alkaline washing step gathers in the bottom of the scrubber 17, and after being re-directed again to the circulation box 18, the agent is sprinkled again from the sprinkler 16 and circulated within the alkaline neutralization/washing unit 3. Preferred alkaline neutralization/washing agent includes sodium hydroxide and the like. In this neutralization/washing step, gas comprising elements such as chlorine, sulfur, and nitrogen, that is an acid gas, is neutralized to form water, salts, and the like.

The waste water utilized in the alkaline neutralization/washing treatment is sent from the circulation box 18 to the solid-liquid separator unit 4 where it is subjected to solid-liquid separation. The waste water which has been repeatedly used is periodically sent to the solid-liquid separator unit and fresh alkaline neutralization/washing agent is utilized, thereby enabling to improve the efficiency of the washing in the alkaline neutralization/washing unit 3.

Figure 4:
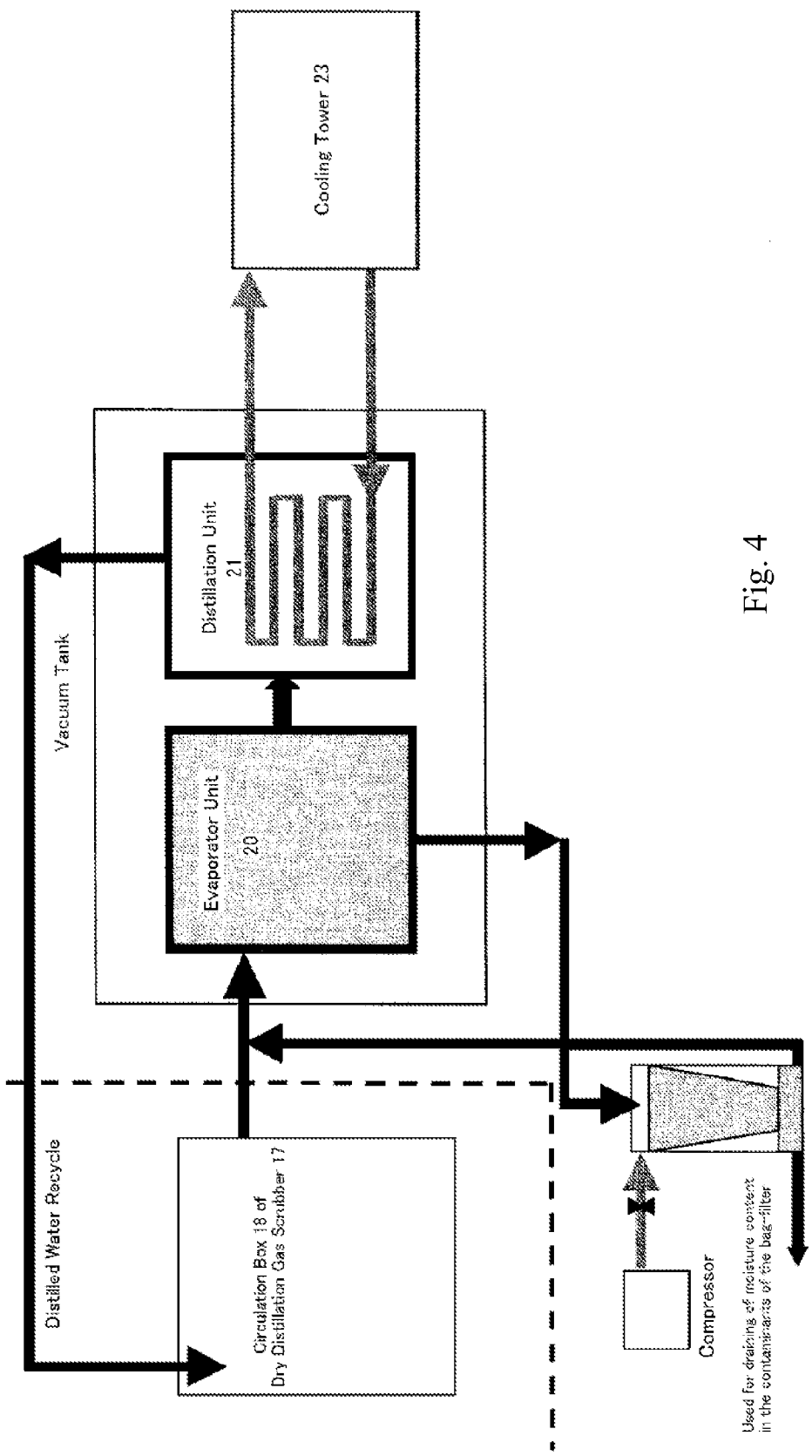
FIG. 4 is a diagram illustrating the configuration of the solid-liquid separator unit.

FIG. 4 is a diagram illustrating the configuration of the solid-liquid separator unit 4.

The solid-liquid separator unit 4 is comprised of an evaporator unit 20 and a distillation unit 21, both of which are placed inside the vacuum tank. The distillation unit 21 is in linked with a cooling tower 23. The waste water which is sent from the neutralization unit 3 is evaporated in the evaporator unit 20 to become gas and highly concentrated liquid. The gas is further sent to the distillation unit 21 and then passed through the cooling tower 23 where it is cooled to produce distilled water, and the water is recycled to the circulation box in the neutralization unit to be reutilized. The highly concentrated liquid is filtered through a bag filter 22 and further separated in to a liquid and solid, which solid is re-directed to the thermal decomposer unit 1 where it is thermally decomposed again with new material organic matter. The separated liquid is re-directed to the evaporator unit 20 in the solid-liquid separator unit 4, where it is subjected to evaporation/distillation again with the waste water sent from the neutralization unit to be separated into liquid and solid. Furthermore, such separated liquid is distilled by cooling and then re-directed to the neutralization/washing unit 3 where it is reutilized with the alkaline neutralization/washing agent in the alkaline neutralization/washing step. Therefore, the waste water is not discharged from the apparatus.

Additionally, in order to separate organic components in the highly concentrated liquid which was concentrated in the evaporator unit 20, a microbial bath may be provided downstream of the bag filter 22 (not shown). In this case, it is also possible to re-direct a liquid clarified in the microbial bath to the alkaline neutralization/washing unit 3 where it is recycled in the alkaline washing step with the alkaline neutralization/washing agent. Therefore, since the separated liquid is distilled by cooling and then re-directed to the neutralization/washing unit 3 while the solid is re-directed to the thermal decomposer unit 1 where it is recycled in the thermal decomposition, the waste water is not discharged from the apparatus.

Here, since the solid-liquid separator unit 4 is in a vacuum condition, the boiling point of the waste water is as low as 30-60 degrees C., preferably 40-50 degrees C. Therefore, in the evaporator unit, the waste water boils and its water content becomes vaporized only by heating the waste water to 30-60 degrees C., thereby enabling to concentrate and separate solid component such as organic matter or inorganic components. Compared to heating the waste water from room temperature to 100 degrees C. or higher, the time to a boil can be shortened and the amount of heat used is substantially less, therefore the solid-liquid separation can be carried out at low cost. Furthermore, since the distillation unit 21 is also in a vacuum condition and thus the boiling point of the waste water is as low as 30-60 degrees C., preferably 40-50 degrees C., the time required for heating will be shortened and the amount of heat used is reduced.

The invention claimed is:

1. A method of treating organic matter, said method comprising the steps of thermal decomposition of material organic matter and treating gas generated in said thermal decomposition step, characterized in that:
said step of thermal decomposition comprises the step of decomposing said material organic matter into carbide and gaseous component, and
said gas treatment step comprises the steps of:
(1) catalytically oxidizing the gaseous component generated in said thermal decomposition step;
(2) neutralizing/washing the oxidized gas;
(3) subjecting waste water produced in said neutralization/washing step to solid-liquid separation;
(4) thermally decomposing a solid component again separated in said solid-liquid separation step together with said material organic matter in said thermal decomposition step; and
(5) recycling the liquid component separated in said solid-liquid separation step to at least of one of said solid-liquid separation step and said neutralization/washing step, wherein said solid-liquid separation step comprises the steps of evaporating said waste water produced in said neutralization/washing step and filtering liquid produced in this evaporation step through a bag filter to separate the liquid into solid and liquid components.

2. The method of treating organic matter according to claim 1, characterized in that said material organic matter is an industrial waste.

3. The method of treating organic matter according to claim 1, characterized in that said neutralization/washing step is carried out using sodium hydroxide.

4. The method of treating organic matter according to claim 1, characterized in that said solid-liquid separation step is carried out in a vacuum.

5. The method of treating organic matter according to claim 4, characterized in that said solid-liquid separation step is carried out at a temperature between 30 degrees C. and 60 degrees C.

6. The method of treating organic matter according to claim 1, characterized in that said catalytic oxidation step is carried out using a metal selected from the group consisting of Pt, Cr, Cu, and Mn or a metal oxide.

7. The method of treating organic matter according to claim 1, characterized in that said solid-liquid separation step comprises the step of distilling the liquid produced in said evaporation step.

8. The method of treating organic matter according to claim 1, characterized in that said solid-liquid separation step comprises a step of subjecting the liquid component filtered through said bag-filter to a microbial treatment.

9. The method of treating organic matter according to claim 1, characterized in that:
said method comprises the step of further decomposing carbide generated in said thermal decomposition step under a reduction atmosphere to separate inorganic matter in said carbide from said carbide and the step of binding said inorganic matter with oxygen to produce an inorganic oxide (ceramics).

10. The method of treating organic matter according to claim 9, characterized in that the initial heat source in said thermal decomposition step is an electric heater.

11. The method of treating organic matter according to claim 1, wherein said neutralization/washing step of said oxidized gas includes neutralizing an acid gas.

12. The method of treating organic matter according to claim 1, wherein recycling said liquid component to said solid-liquid separation step includes redirecting said liquid component to said evaporation step.

13. The method of treating organic matter according to claim 1, wherein said solid-liquid separation step is carried out at a temperature between 40 degrees C. and 50 degrees C.

14. An apparatus for treating organic matter, said apparatus thermally decomposing material organic matter in a thermal decomposer unit and comprising a gas treatment unit for treating gas generated in said thermal decomposition, characterized in that:
said thermal decomposer unit comprises means for decomposing said material organic matter into carbide and gaseous component,
said gas treatment unit comprises means for oxidizing the gaseous component generated in said thermal decomposer unit; means for neutralizing/washing said oxidized gas; and means for subjecting waste water produced in said neutralization/washing to solid-liquid separation, and
said apparatus again thermally decomposing solid component separated in said solid-liquid separation means together with said material organic matter in said thermal decomposer unit and recycling liquid component separated in said solid-liquid separation means to said neutralization/washing means, wherein said solid-liquid separation means comprises means for evaporating waste water produced in said neutralization/washing and means for filtering the liquid produced in this evaporation to separate the liquid into solid and liquid components.

15. The apparatus for treating organic matter according to claim 14, characterized in that said solid-liquid separation means comprises means for distilling said liquid produced in said evaporation means.

16. The apparatus for treating organic matter according to claim 14, wherein said means for filtering the liquid includes a bag filter.

17. The apparatus for treating organic matter according to claim 14, wherein said solid-liquid separation means has a temperature in a range from 30 degrees C. to 60 degrees C.

18. The apparatus for treating organic matter according to claim 14, wherein said solid-liquid separation means has a temperature in a range from 40 degrees C. to 50 degrees C.

19. The apparatus for treating organic matter according to claim 14, wherein said apparatus is adapted to retain said waste water within said apparatus.

20. An apparatus for treating organic matter, said apparatus comprising:
a thermal decomposer unit having an inlet and an outlet and having a hermetic seal when said inlet and said outlet are in a closed condition; and
a catalytic oxidation unit fluidly communicating with said thermal decomposer unit when said outlet is in an open condition;
a neutralizing/washing apparatus fluidly communicating with said catalytic oxidation unit; and
a solid-liquid separator including a liquid evaporator and a bag filter, said liquid evaporator fluidly communicating with said neutralizing/washing apparatus, said bag filter communicating with said thermal decomposer.

* * * * *